Patented Feb. 24, 1942

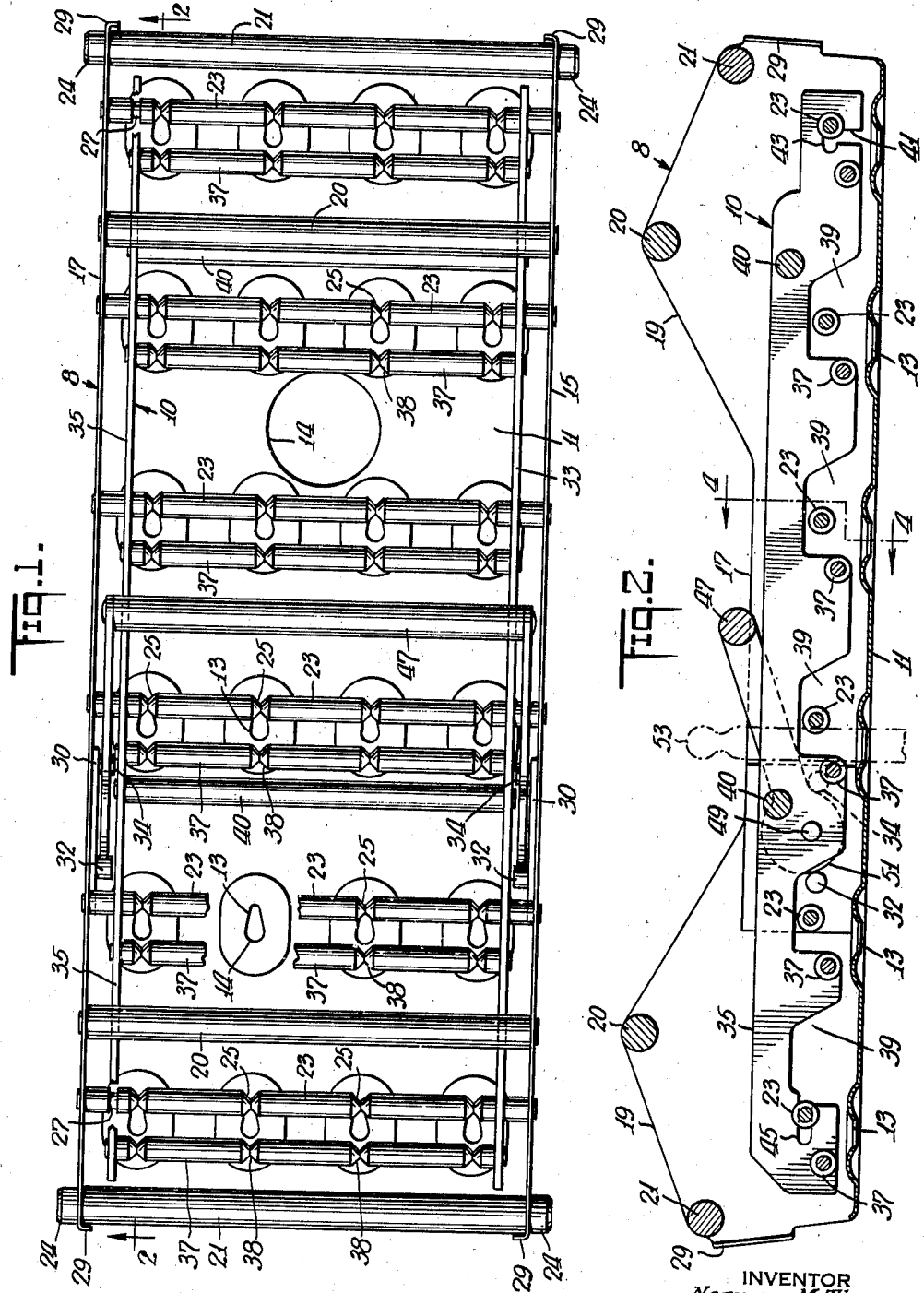

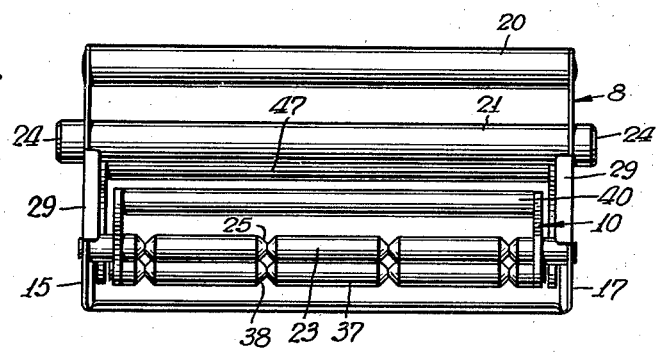
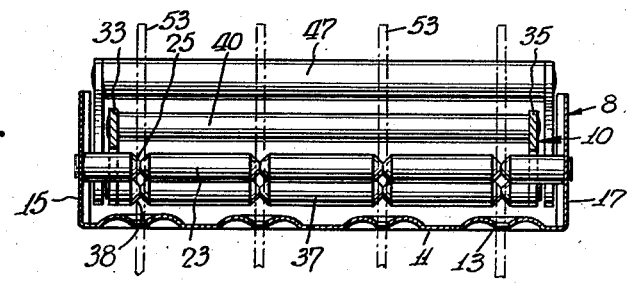
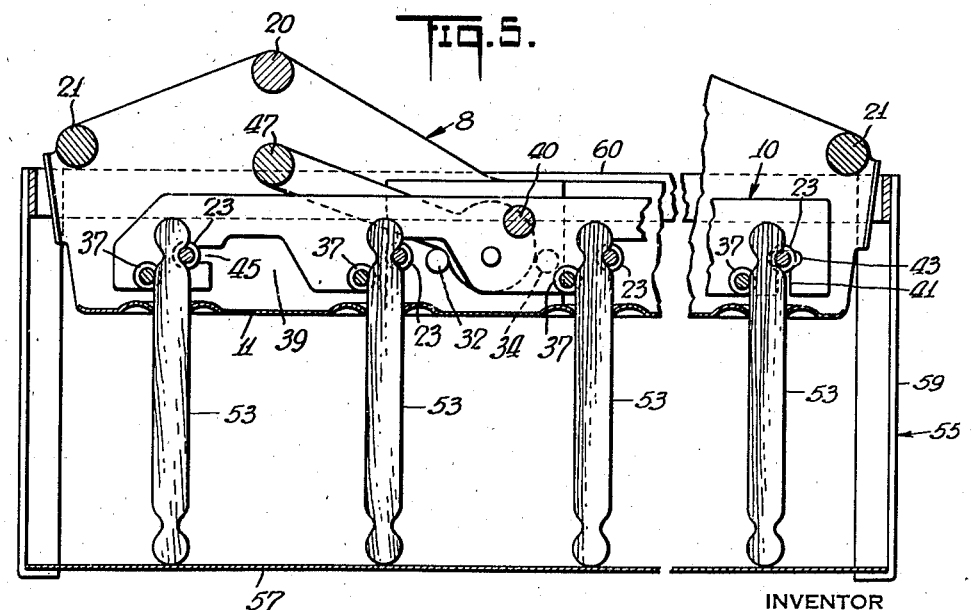

2,274,625

UNITED STATES PATENT OFFICE 2,274,625

PORTABLE STICK HANDLING DEVICE

Norman M. Thomas, Medford Lakes, N. J., and Herman Siemund, Chicago, Ill., assignors to Joe Lowe Corporation, New York, N. Y., a corporation of Delaware Application May 10, 1941, Serial No. 392,856

6 Claims. (Cl. 294—87)

The present invention relates to improvements in apparatus for simultaneously locking, manipulating and releasing a plurality of handle members, such as wooden handle sticks of the type used extensively in the candy and ice cream industries, in the manufacture of stick confectionery products, and it has particular relation to a portable type of carrier adapted to receive, position, lock, manipulate and release a plurality of such handle members simultaneously in a most efficient, sanitary and economical manner.

The invention is a continuation in part of the apparatus shown and described in our co-pending application Serial No. 320,570, filed February 24, 1940, entitled improvement in a "Portable stick handling carrier," since matured into Patent No. 2,248,648.

With the present invention we have provided a simple, inexpensive and durable portable stick handling device of a highly sanitary construction, which is especially adapted for holding a plurality of handle members in vertical spaced relation for positioning within a plurality of similarly spaced cavities of a multi-cavity mold.

An object of the present invention is to provide a simple, inexpensive and durable portable stick handling device, which will positively engage and clampingly hold a plurality of spaced handle members in a vertical position regardless of variations in their dimensions.

Another object of the invention is the provision of a portable stick handling device which will positively engage a plurality of handle members positioned therein with a three point wedging contact which will assume their vertical alignment without biting into or otherwise impaling the same thereon, whereby scratches, perforations or other markings are formed permanently on the surfaces thereof.

A further object of the invention is to provide a simple, inexpensive and durable portable stick handling device consisting of two separable members which may be quickly and easily disassembled for cleaning purposes, and thereafter readily reassembled without requiring the use of any tools, the unloosening or tightening of any screws, bolts or other fastening means, etc. to accomplish the desired result.

Another object of the invention is the provision of a simple, efficient and sanitary portable stick handling device consisting of two readily separable members that are substantially free of inaccessible corners, movable parts requiring lubrication and which can collect and harbor dirt, bacteria, germs etc., and which are entirely free of mechanisms requiring adjustment, or incapable of rapid and thorough cleaning.

A further object of the invention is to provide a simple, practical, rugged and durable portable stick handling device which is exceedingly light in weight; capable of convenient operation; assembly and disassembly with little effort by unskilled operators; impossible to jam or otherwise get out of order; devoid of mechanism requiring lubrication; and capable of convenient, quick and thorough cleaning to maintain the high standards of sanitation desired.

Another object of the invention is the provision of a portable stick handling device which is capable of receiving, positioning and maintaining a plurality of handle members in spaced vertical relation by engaging a notch or groove forming a part of an embellishing design thereon without impaling, marking or otherwise scratching or injuring the surface of such handle members.

Other and further objects and advantages of the invention reside in the detailed construction of the device, which result in simplicity, economy and efficiency, and which will be apparent from the following description, wherein a preferred form of embodiment of the invention is shown, reference being had to the accompanying drawings, forming a part hereof, wherein like numerals indicate like parts, in which:

Fig. 1 is a top plan view of an assembled portable stick handling device made in accordance with the principles of our invention;

Fig. 2 is a side elevational view of the assembled device shown in Fig. 1, the same being taken along the line 2—2 thereof, and illustrating in dotted lines the positioning of a handle member therein;

Fig. 3 is an end elevational view of the device shown in Fig. 1;

Fig. 4 is a cross-sectional view of the device shown in Fig. 2, the same being taken along the line 4—4 thereof, looking in the direction of the arrows and illustrating in dotted lines the manner in which the handle members are positioned therein; and Fig. 5 is a fragmentary longitudinal sectional view of the device shown in Fig. 1, showing the same positioned over a depth gauging rack and illustrating the manner in which the even depth to which the handle members project through the device is determined; and also illustrating the manner in which the handle members are locked securely and vertically by a three point wedging action within said device.

Referring now to the drawings, there is shown in Fig. 1 a portable stick handling device consisting of a main or bottom frame structure 8 and a separable top or second frame structure 10, which structures are adapted to be readily assembled or separated for cleaning purposes without the aid of tools of any nature or description whatsoever.

The main or bottom frame structure 8 consists of a U-shaped plate member of integral construction made of any non-rusting metals. The bottom of the plate member 11 is provided with a plurality of spaced apertures 13, which, in the arrangement shown, are aligned in four transversely spaced rows each row consisting of six longitudinally spaced apertures. A large opening 14 is provided somewhere in the base plate 11 to permit inspection of the rate of freezing of the material in the mold. Of course, any arrangement may be provided, depending upon the desired positioning of the handle members or sticks. Each of the apertures 13 are shown to be of substantially truncated triangular shape, having an outwardly curved back or base 16, and each of the apertures is larger than the handle member to be received. It is apparent that any desired shape of handle member may be manipulated without departing from the spirit of the invention by varying the size and shape of the apertures 13 accordingly.

The upwardly projecting sides 15 and 17 of the bottom plate 11 have portions adjacent each end, as indicated at 19, which project beyond the normal height thereof for receiving handle members for manipulating the apparatus. In the construction shown, two pairs of two handle members 20 and 21 are each mounted transversely of the apparatus, and the outer handle members 21 of each pair project through the sides 15 and 17, a short distance, as indicated at 24. The projecting studs 24 provide means for suspending the apparatus within the pan of a conventional mold (not shown), as these studs 24 are designed to rest upon the upstanding sidewalls of said mold pan.

A plurality of transversely extending rods 23 are fixedly secured between the sides 15 and 17 of the main frame structure 8 in a horizontal plane spaced vertically from the bottom plate 11. The rods 23 are so spaced longitudinally of the main frame structure 8 that one extends above each transverse row of apertures 13 adjacent one end thereof, as best shown in Fig. 1. Each rod 23 is provided with a series of similarly spaced radial V-shaped grooves 25, which are so spaced on each rod as to be in vertical alignment with one end of each of the apertures 13 in the bottom plate 11. The two rods 23 at opposite ends of the main frame structure 8 are also provided at each end thereof intermediate their outer grooves 25 and the sides 15 and 17 with a rectangularly shaped groove or notch 27 for receiving the engaging means of the second frame structure when the apparatus is assembled. An intermediate portion of the end walls of the sides 15 and 17 is turned inwardly of the frame structure 8, as indicated at 29, to provide end flanges to facilitate engagement of the devices when they are being moved in an end to end arrangement through a chilling tunnel or other continuous conveyor operation (not shown).

Vertically extending plates 30 are mounted intermediate each of the sides 15 and 17 directly opposite one another by any suitable means such as welding, etc. Each plate 30 is provided with two spaced outwardly projecting studs 32 and 34 arranged in horizontal alignment adjacent the lower end thereof and spaced from the bottom plate 11. These studs 32 and 34 serve as cam engaging means and stops for the cam operating handle lever of the secondary frame structure 10 hereinafter to be described.

The separable secondary frame structure 10 consists of a pair of relatively long and narrow rectangular side plates 33 and 35 secured together at longitudinally spaced intervals by a plurality of transversely extending rods 37. The bottom edges of the plates 33 and 35 are indentured, as indicated at 39, to allow for the clearance of the rods 23 of the main frame structure when the apparatus is assembled. The side plates 33 and 35 are each provided with upstanding vertical slots 41 adjacent one end, and the slots 41 are slightly enlarged at their inner ends, as indicated at 43. The opposite ends of the plates 33 and 35 are each provided with a longitudinally extending slot 45 intermediate the edges which is in open communication with the outer edge of the end indenture 39 thereof. Each of the rods 37 of the secondary frame structure 10 are spaced similarly to the rods 23 of the main frame structure, and are provided with a series of similarly spaced V-shaped radial grooves or notches 38 which are likewise spaced transversely of the secondary frame structure 10 so that they will be in vertical alignment with the opposite end of the apertures 13 of the bottom plate 11 when the same is properly mounted thereon and in spaced relation to the corresponding rods 23 of the main frame structure. A pair of spaced transversely extending handles 40 is provided for manipulating the secondary frame structure 10.

A U-shaped handle member 47 is pivotally secured to stud shafts 49 fixedly mounted in the plates 33 and 35 intermediate the ends thereof. The handle member 47 adjacent its mounting on the stud shaft 49 is enlarged to provide a circular cam conformation 51, which acts to engage the projecting studs 32 and 34 of the main frame structure 8 as will be hereinafter described.

In assembling the two separable frame structures 8 and 10, the handle 47 of the secondary frame structure 10 is moved to project toward the center of said structure, and the same is longitudinally inserted under one pair of handles 20 and 21 of the main frame structure 8 and the bottom plate 11 with the end having the vertical slots 41 foremost until the opposite end has cleared the opposite pair of handle members 20 and 21. Then the secondary frame structure 10 is moved in the opposite direction until the longitudinal slots 45 receive and engage the grooves or notches 27 of the back end rod 23. In this position the vertical slots 41 are immediately above the grooves or notches 27 of the front end rod 23, and may be dropped in place thereover. It will be noted that the rods 37 of the secondary frame structure 10 are interposed and interspaced with the rods 23 of the main frame structure 8, and that the rods of the different structures are arranged in different horizontal planes. It will also be noted that the radial V-shaped notches or grooves of the respective rods are in longitudinal alignment with each other, and are substantially in vertical alignment with the opposite ends of the apertures 13 in the bottom plate 11.

When it is desired to load the device with a plurality of handle sticks 53, the handle member 47 is positioned so as to project towards the middle thereof, and placed over a stick gauge 55, which is shown in Fig. 5, consisting merely of a base plate 57 having upstanding ends 59 suitably connected by horizontal brace bars 60, for supporting the portable stick-handling device a predetermined distance above the base plate 57. The handle sticks 53 may be manually or otherwise positioned between the rods 23 and 37 of the respective frame structures 8 and 10 and also through the stick receiving means 13 in the bottom plate 11 until their lower ends rest on the top surface of the base plate 57 of the stick gauge 55. The handle sticks 53 are now in position to be securely locked in said portable carrier, and this may be accomplished merely by moving the pivotal handle 47 to its opposite position, pointing away from the center of the device. In moving the handle 47, it will be noted that the cam conformation 51 engages the stud 32, as best shown in Fig. 2, and causes the rods 37 of the secondary frame structure 10 to be moved toward the fixed rods 23 of the main frame structure. This movement of the rods 37 causes the handle sticks 53 to be secured in V-shaped grooves 38 and also forces the handle sticks 53 forwardly, wedging them into the V-shaped grooves 25 of the fixed rods 23 and against the truncated end of the triangularly shaped apertures 13 of the plate member 11. Thus, it will be seen that each of the handle sticks is wedged by a three point contact by the rods 37 of the secondary frame structure against the rods 23 of the main frame structure and the truncated end of the handle receiving means 13 and since the latter two are in exact vertical alignment, the handle sticks 53 must be vertically aligned in the stick handling device.

When it is desired to release the handle members from the device, the operator merely has to move the handle 47 toward the center thereof, which withdraws the rods 37 away from the rods 23. The projecting stud 34 serves merely to prevent the handle 47 from being moved to a position substantially horizontal, as best shown in Fig. 2, where its grasping may become difficult. When the rods 23 and 37 are separated the handle members 53 may be withdrawn or allowed to drop through the stick receiving means 13 by gravitational force.

In order to separate the frame structure 10 from the frame structure 8, it is merely necessary to raise the pivotal handle 47 to its open position, lift up the forward end of the top frame structure 10 until the rod 23 is clear of the slot 41, then move the top frame member back until the longitudinal slot 45 is clear of its engaging bar, lift up and slide the whole frame structure forwardly until the end having the longitudinal slot 45 is clear of its pair of handles 20 and 21, and then lift said end above said handles and slide the entire frame structure backwardly until it is free of the main frame structure. Each frame structure may be cleaned easily, or repaired or replaced, whenever desired, without the aid of tools of any kind.

Although we have only described in detail one form which our invention may assume, it will be apparent to those skilled in the art that the invention is not so limited, but that various modifications may be made therein without departing from the spirit thereof or from the scope of the appended claims.

What we claim is:

1. A stick handling device comprising in combination a main frame structure and a separable secondary frame structure, said main frame structure having a plurality of spaced rows of spaced handle receiving means, a plurality of longitudinally spaced rods arranged in spaced relation to said handle receiving means and being vertically aligned with one side thereof, said secondary frame structure having a plurality of longitudinally spaced rods adapted to be interspaced with the rods of said main frame structure, the adjacent rods of each structure being disposed in different horizontal planes, and means for moving the rods relative to one another for varying the spacing therebetween.

2. A stick handling device comprising in combination a main frame structure and a separable secondary frame structure, said main frame structure having a plurality of spaced rows of spaced handle receiving means, a plurality of longitudinally spaced rods arranged in vertically spaced relation to said handle receiving means, and cam engaging means, said secondary frame structure having a plurality of longitudinally spaced rods adapted to be interspaced with the rods of said main frame structure and an operating lever provided with a cam conformation adapted to engage the cam engaging means of said main frame structure for causing the spaced rods of the secondary frame structure to be moved relative to the rods of the main frame structure for varying the spacing therebetween.

3. A stick handling device comprising in combination a main frame structure and a separable secondary frame structure, said main frame structure having a plurality of spaced rows of spaced handle receiving means, a plurality of longitudinally spaced rods arranged in vertically spaced relation to said handle receiving means, and cam engaging means, said secondary frame structure having a plurality of longitudinally spaced rods adapted to be interspaced with the rods of said main frame structure in a plane between the plane of said rods of said main frame structure and the plane of said handle receiving means, and an operating mechanism provided with a cam conformation adapted to engage the cam engaging means of said main frame structure for causing the spaced rods of the secondary frame structure to be moved relative to the rods of the main frame structure for varying the spacing therebetween whereby handle sticks positioned therein will be locked by wedging them between said rods of the secondary frame structure on one side against the handle receiving means and the rods of the main frame structure on the opposite side.

4. A stick handling device consisting of a main frame structure having a plurality of transversely extending horizontal rods spaced longitudinally thereof and spaced vertically with respect to a plurality of spaced stick receiving means, a second frame structure having a plurality of transversely extending horizontal rods spaced longitudinally thereof, the rods of the one frame structure being in a different horizontal and vertical plane from the rods of the other frame structure when said structures are assembled, and means for moving one of said structures relative to the other structure for varying the spacing between their respective rods.

5. A stick handling device consisting of a main frame structure having a plurality of transversely extending horizontal rods spaced longitudinally thereof and spaced vertically with respect to a plurality of spaced stick receiving means, a second frame structure having a plurality of transversely extending horizontal rods spaced longitudinally thereof, the rods of the second frame being interposed with the rods of the main frame structure in a horizontal plane different from the plane of the rods of the main frame structure and the plane of its stick receiving means, and means for moving the second frame structure relative to the main frame structure for varying the horizontal spacing between their respective rods.

6. A stick handling device consisting of a main frame structure having a plurality of transversely extending horizontal rods spaced longitudinally thereof and in spaced vertical relation with respect to one side of a stick receiving aperture, a second frame structure having a plurality of transversely extending horizontal rods spaced longitudinally thereof so as to position them on the opposite side of said stick receiving aperture, the rods of one frame structure being in a different horizontal plane from the rods of the other frame structure, means on one frame structure adapted to cooperate with a means on the other frame structure for causing relative movement therebetween whereby the intermediate rods are caused to move across a portion of said stick receiving aperture and towards said rods on the opposite side thereof whereby the sticks within said device will be securely locked in vertical alignment by a three point wedging contact.

NORMAN M. THOMAS.
HERMAN SIEMUND.